United States Patent [19]

Aanerud et al.

[11] 4,416,061
[45] Nov. 22, 1983

[54] METHOD FOR JOINTING CABLES

[75] Inventors: Lars Aanerud, Blystadlia; Georg Balog, Tranby, both of Norway

[73] Assignee: International Standard Electric Corporation, New York, N.Y.

[21] Appl. No.: 280,755

[22] Filed: Jul. 6, 1981

[30] Foreign Application Priority Data

Aug. 26, 1980 [NO] Norway .................................. 802529

[51] Int. Cl.³ ........................................... H01B 13/20
[52] U.S. Cl. .................................... 29/828; 174/84 C
[58] Field of Search ....................... 29/828, 235, 281.5; 174/84 C, 89, 88 R; 269/287, 43; 228/49 B

[56] References Cited

U.S. PATENT DOCUMENTS

| | | | |
|---|---|---|---|
| 2,433,172 | 12/1947 | Tipton | 269/287 X |
| 3,044,334 | 7/1962 | Broske | 174/84 C X |
| 3,487,534 | 1/1970 | Schustack | 29/235 X |
| 3,711,920 | 1/1973 | Simmons, Jr. | 29/281.5 X |

FOREIGN PATENT DOCUMENTS 978034  12/1964  United Kingdom ................... 174/89

Primary Examiner—Howard N. Goldberg
Assistant Examiner—Carl J. Arbes
Attorney, Agent, or Firm—John T. O'Halloran; Mary C. Werner

[57] ABSTRACT

A method for jointing the armouring wires of electrical cables, in particular power cables, in order to ensure that the stress or tension in the cable during handling and installation is equally distributed among the individual armouring wires. The armouring wires are preliminary locked in fixed positions along a cable circumference and tensioned towards each other before jointing, the individual wire joints being performed along a circumference or in a row along a generatrix of the cable.

7 Claims, 10 Drawing Figures

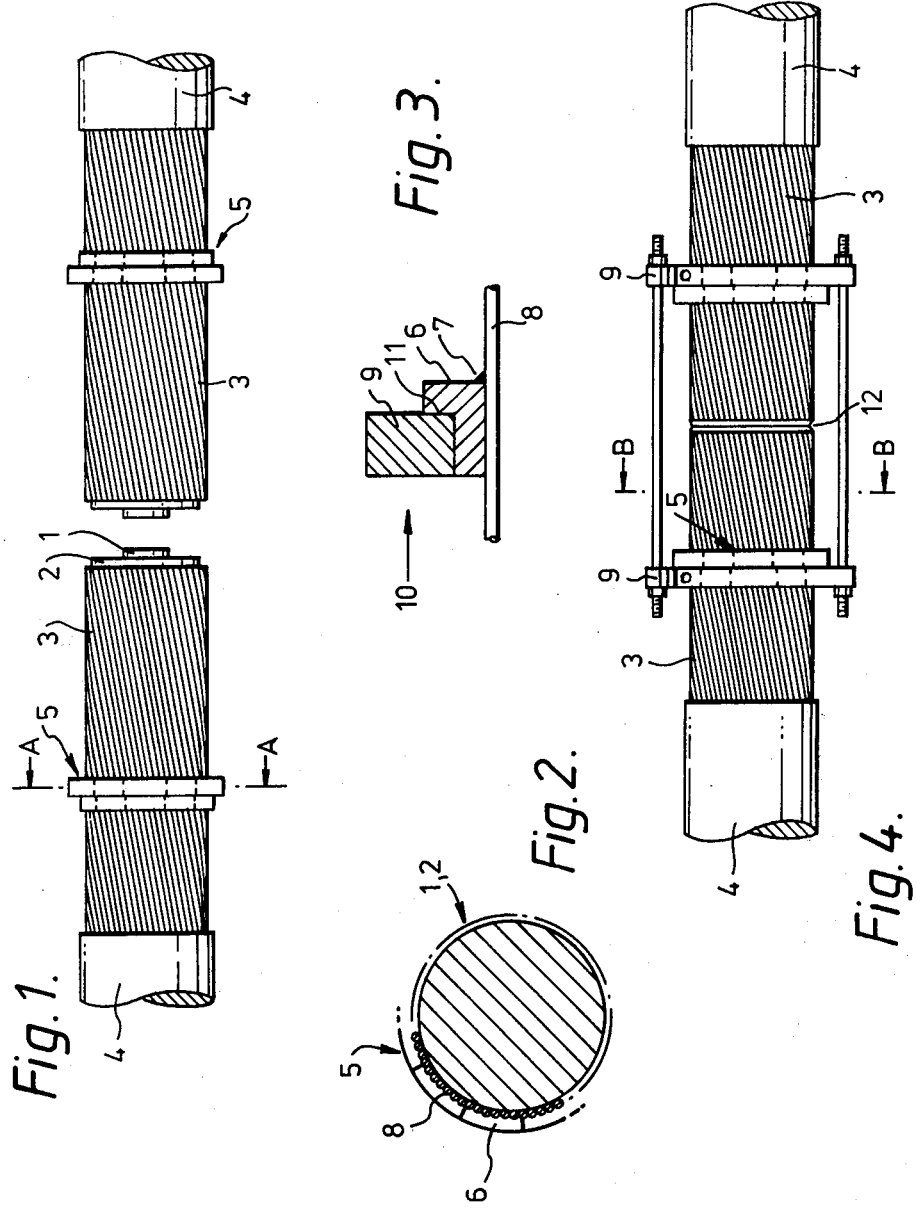

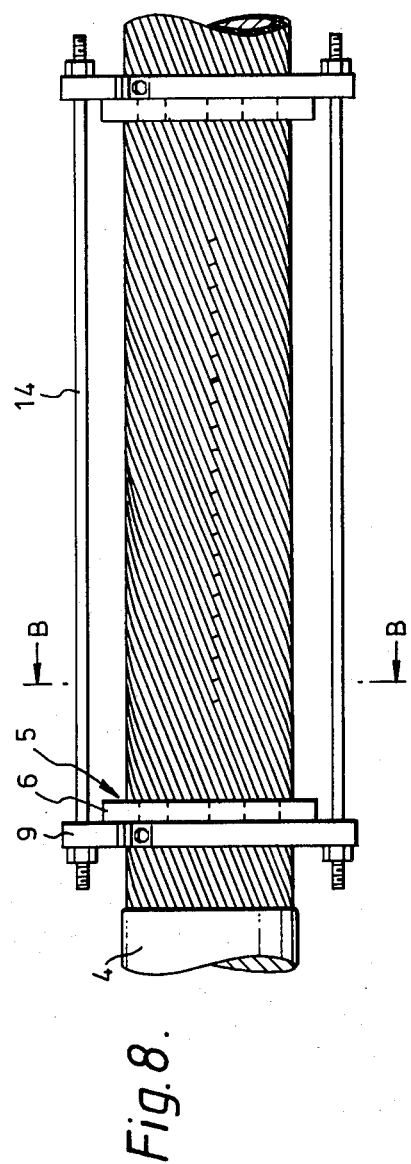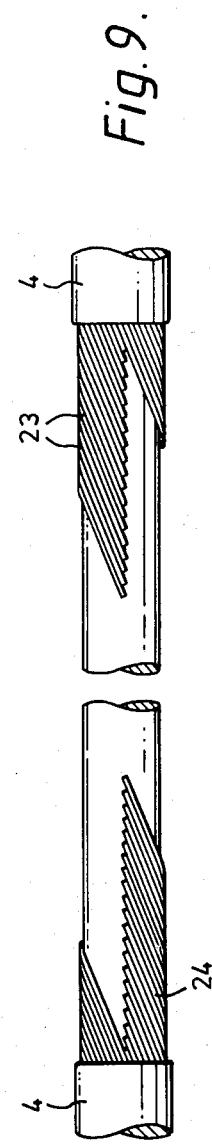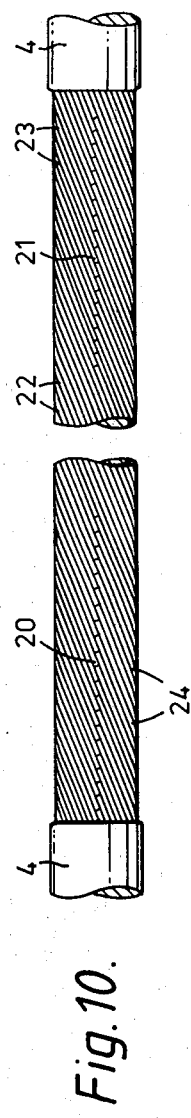

METHOD FOR JOINTING CABLES

BACKGROUND OF THE INVENTION

1. Field of the Invention

The present invention relates to a method for jointing cables comprising a cable core constituted by one or more insulated conductors which may be enclosed within an impervious sheath, at least one layer of armouring elements, e.g. wires, surrounding the core and possibly outer corrosion protective means, including conventional steps of jointing the core.

The invention in particular relates to a method for jointing the armouring wires of cables which are subjected to large longitudinal tension during or after installment.

2. Description of the Prior Art

The armouring of cable is designed to satisfy two requirements—protection of the cable core against mechanical external forces acting in a substantially radial direction and protection of the cable core against longitudinal tension.

To provide the necessary protection, band (or tape) type as well as wire type armour are used. Usually the armouring wires or bands are made of steel, e.g. galvanized steel or copper. While the band armouring provides best protection against radial forces, wire armouring is usually provided to take care of longitudinal tension.

When jointing the armouring of cables which are subjected to longitudinal forces to a limited extent, the armouring elements are usually jointed by an ordinary welding or soldering process, the only requirement being that the armour joint should be capable of withstanding radial forces to the same extent as does the armour. According to one method, the armouring elements from the two cable ends are joined with large overlap, the elements from one end being taped or banded onto the core at intervals to provide several slightly extending circular ridges. The elements from the other end are then taped or banded over the first layer, whereby this layer receives a wavy appearance and is locked onto the first layer. This method has, however, several obvious drawbacks.

It is common practice to displace the armour joint relative to the core joint, and when several layers of armour are concerned, to evenly distribute the joints of the various layers over a certain length of the cable.

In connection with cables which are subjected to large longitudinal tension, such as submarine cables which are lowered to the sea bed, it is essential that the armour joint can withstand the tension caused by the weight of the cable.

The problem of obtaining the desired tension resistant joints is strongly pronounced when an installed submarine cable has been damaged and must be repaired at sea.

In order to ensure that the armour joint takes up the desired tension, it is essential that the armour elements take up equal parts of the total tension or, in other words, that the total tension is evenly distributed among the armouring parts.

When circular wire armoured cables are concerned it has been suggested to thread the wire ends and to use a set of tensioning rods to tension each wire individually until they all are considered to have equal tension. When smaller tensions are concerned this method is satisfactory, but it has certain drawbacks when used on cables which are subjected to large tension.

In order to be able to use tensioning rods, the two sets of armouring wires must, when laid back onto the cable core after the core has been jointed, be cut so as to leave a predetermined gap between the wire ends. The ends are then threaded to fit the inside threads of the tensioning rods, whereupon the individual rods are screwed onto the wire ends and tightened. The tightening process causes the tensioning rods to take the same angle of lay as the wires and while the rods should be as long as possible to ensure sufficient tensioning, they should be as short as possible so as not to increase the diameter of the cable excessively. The possibility of damaging the wires at the entrance of the rods is also severe because the wires have to be screwed at an angle into the tensioning rod.

SUMMARY OF THE INVENTION

It is the primary object of the present invention to provide a new and improved method for jointing cables and in particular for jointing the armouring elements of cables which are or may be subjected to large longitudinal tension so as to ensure that the tension is evenly distributed among the armouring elements, while overcoming drawbacks of known methods.

When two cables are to be jointed end to end, it is essential that the two ends are brought to overlap sufficiently before starting the jointing operation. It is furthermore essential that the armouring is prepared for jointing before starting jointing of the core.

The preparation of the jointing process starts with determination of the positions at which the cable core and the various layers of armouring are to be jointed. When the cable comprises two layers of armouring and each layer consists of only one joint, it may be practical to place one armour joint on each side of the core joint, in the longitudinal direction of the cable.

Having marked the outer armouring layer for jointing, the armouring elements on each of the cable ends are preliminary locked in a fixed position relative to each other along a cable circumference at right angles to the cable axis. Such locking may be obtained by for instance mounting a circumferential bracket onto the elements on each cable end a certain distance from each other.

When the preliminary locking has been effected, the armouring elements of the outer layer may be unwound or lifted so as to give access to possible lower armouring layers and the cable core. In some cases the armouring wire dimensions are so large and the material so rigid that the wires must be cut and replaced after jointing of the core. In this case there will be two armour joints for each armour layer, but only one of these will have to be treated as described herein.

While the locking device may be a circular bracket it will be more practical to use a number of sub-brackets in order to be able to unwind the armouring elements also at the preliminary locking position. The sub-brackets should be aligned and maintained at the aligned position during the operation of mounting them onto groups of armouring elements.

The cable core which as mentioned may be constituted by one or more insulated conductors possibly enclosed within an impervious sheath, is jointed in a conventional manner, whereupon the armouring layers are ready for jointing. If the armouring wires are to be welded, the individual wire welds may be performed along a circumference, while in the case of soldering, the individual wire joints should be performed in a row along a generatrix on top of the cable.

The two sets of armouring elements are now tensioned towards each other to obtain overlapping by applying a circumferential clamping device to each of the two sets of brackets and pressing the clamping devices together in a direction parallel to the cable axis.

By applying such clamping devices to the two sets of brackets under pressure there is automatically obtained an alignment of the sub-brackets so that the armouring elements are again brought to the preliminary locking position. As soon as a predetermined alignment and tension are obtained, the armouring elements are cut to abut each other, and jointed by welding, soldering or by other process.

Now that the armouring elements are jointed one by one, or in groups, at the desired tension, the clamping devices are released and the intermediate locking is broken by detaching the brackets. Finally the armour joint may be treated in a conventional manner with corrosion protection.

In order not to damage the cable core during the armouring jointing process, and also in order to reduce corrosion of the armouring elements at the jointing place, a metallic shield, preferably of aluminum when steel armour is concerned, is placed around the core at the jointing place before jointing. Such shield will have the function of a sacrificial anode.

An armour joint made in accordance with this invention is superior to armour joints made by conventional technique. The tension caused in a submarine cable by for instance lowering the cable to a sea bed has been found to be evenly distributed over the whole circumference of the armour layer(s) jointed in accordance with this invention, and the tension in the core is maintained at a minimum.

BRIEF DESCRIPTION OF THE DRAWING

Above mentioned and other features and objects of the invention will be clearly understood from the following detailed description of embodiments of the invention taken in conjunction with the drawing, where FIG. 1 schematically illustrates two cable ends where the armouring is prepared for jointing before jointing the core, in accordance with one embodiment of this invention, FIG. 2 schematically illustrates a cross-section of the cable and sub-brackets along line A—A in FIG. 1, FIG. 3 shows a cut through a sub-bracket welded onto an armouring element, FIG. 4 schematically shows the two sets of armouring wires tensioned towards each other by application of clamping devices, in accordance with the embodiment described in connection with FIG. 1, FIGS. 9 and 10 illustrate further embodiments.

DESCRIPTION OF THE PREFERRED EMBODIMENT

Figure 7:
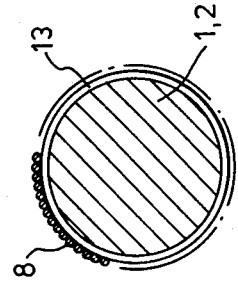
FIG. 7 shows a cross-section of FIG. 5 along line C—C, FIG. 8 schematically illustrates a second embodiment of the invention.

FIGS. 1–7 illustrate an embodiment of the invention, where the armouring wires are jointed along a circumference of the cable. FIG. 1 illustrates two ends of a power cable constituting a conductor 1 with insulation 2 and armouring 3, as well as an outer corrosion protective layer 4.

The design of the core is of no significance in connection with the present invention, and while the core may serve power or telecommunication purposes it may possibly also include an impervious sheath, which also has to be jointed. In the present description the term core includes all cable components below the armouring layer(s).

While FIG. 1 for the sake of simplicity shows that the two ends are prepared identically for jointing, so that the armour joint would be arranged at the same cross-section as the joint of the core, the practical solution would be that the two joints are displaced relative to each other. It may even be desirable to prepare the ends such that the cores are jointed at a position displaced from the area between the preliminary locking positions indicated by bracket arrangements 5.

After removing outer corrosion protective layers 4 and cleaning the armouring elements at the desired preliminary locking positions, a set of brackets 5 are placed around the circumference of the cable and soldered or welded in groups onto the armouring elements. In the drawing the armouring elements are illustrated as round wires, it being understood that the invention is equally well applicable with flat or other types of armouring.

In principle it would be possible to use a bracket 5 in the form of a full ring or two half rings mounted onto the armouring elements. In order to enable displacement of the joints and to facilitate lifting or unwinding of the armouring wires, a practical solution is, however, to use two sets of smaller brackets 6, each of which is mounted onto a group of wires as illustrated in FIG. 2.

The brackets 5 may be designed in many different ways, the simplest being to constitute parts of a simple cylindrical ring. However, it may be practical, as shown, to make the bracket assembly constitute a collared cylindrical ring. The cross-section of a collared sub-bracket 6 is shown in FIG. 3. A weld or soldering 7 is indicated by which the sub-bracket 6 is mounted to an armour wire 8. In FIG. 3 is also indicated the application of a clamping device 9 which (as illustrated in FIG. 4) is arranged to be pressed or tensioned in the direction of the arrow 10 (FIG. 3). The clamping device 9 bears against the collar flange 11 while holding the sub-brackets 6 down onto the armour wire 8.

Figure 5:
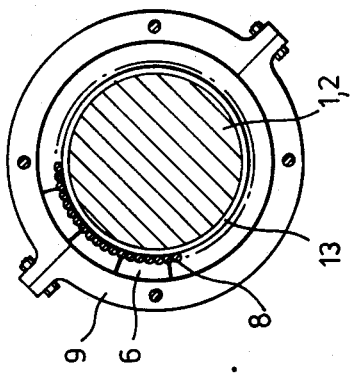
FIG. 5 shows a cross-section of FIG. 4 along line B—B, FIG. 6 schematically shows the jointed armouring elements after the clamps and brackets have been removed.

During the process of aligning and mounting the brackets 6 onto the armouring wires, it will be possible to use the clamping devices 9 shown in FIGS. 3, 4 and 5 also for this purpose. However, one may choose to use a simple bonding device (not shown). As soon as the sub-brackets 6 are mounted to obtain the desired grouping of armouring wires 8 as illustrated in FIG. 2, the bonding device is removed and the grouped armouring wires are lifted or wound off in desired lengths to give access to lower armouring layers and the core.

In FIG. 4 are shown the armouring wires made ready for jointing. The steps of jointing the various components of the core will not be described here. The drawing does not show the possible increase in diameter which may be caused by the joint. By modern jointing technique, however, such diameter increase will be small. It should also be mentioned that when the armour joint is displaced from the core joint, the core diameter at the armour joint will be increased very little or not at all. After the core joint has been completed, the armouring wire groups are replaced or wound back onto the core to resume their original position.

The clamping devices 9 are, as shown in FIG. 3, applied to the two sets of sub-brackets and tensioned so as to obtain alignment and a pre-determined tensioning of the armouring. It is essential that the two sets of armouring wires to begin with are cut so long as to overlap or at least to abut. Thereupon the armouring wires are cut for end jointing as indicated by a V-groove 12.

While it is important that each armouring element of one cable end is abutting an armouring element from the other end, the grouping on one end does not have to correspond to the grouping on the other end.

FIG. 5 being a cut along line B—B in FIG. 4, shows the cable core encompassed with a metallic shield 13, at and near the armour joint, armour wires 8 grouped by sub-brackets 6 as well as a clamping device 9 constituted by two semi-circular devices. The clamping devices 9 are tensioned towards each other by means of tensioning bolts 14. Tensioning rods may also be used.

While FIG. 4 shows that the armouring wires can be jointed along a circular line, the joints of the individual wires may of course be staggered one by one or in groups. This is only a matter of cutting the wires to different positions between the clamping devices 9. This is illustrated in more detail in FIGS. 8–10.

Figure 6:
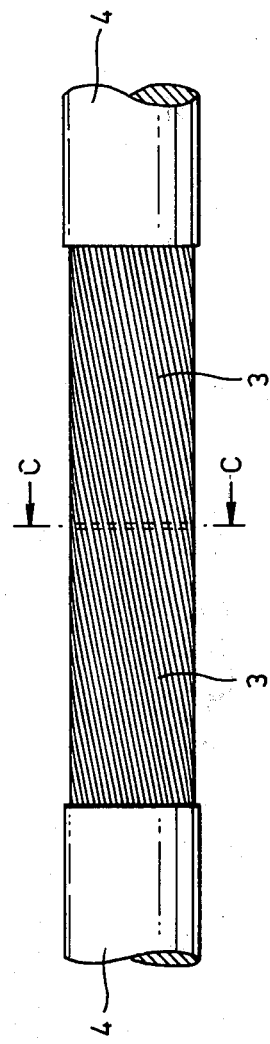

FIG. 6 shows an example of a complete armour joint after the clamping devices 9 have been released and removed and also after the brackets 5, 6 have been removed. As indicated in FIG. 7 which is a cut through the armour joint of FIG. 6 (line C—C), the wires 8 may be jointed in groups of two and two. The metallic shield 13 is acting as a sacrificial anode after installation of the cable.

Finally the corrosion protection layers and possible additional corrosion protection are applied over the armouring elements.

The above detailed description has dealt with jointing of only one armour wire layer, and it should be clear that similar or identical technique may be used for jointing additional layers of wires and/or tapes/bands. It should also be clear that the invention is not limited to jointing of armouring of steel wires/bands, because cable armouring capable of withstanding longitudinal tension is also made of other metals and also of non-metallic material. The actual cable armouring used will of course have to be jointed by using welding/soldering methods and materials suitable for that purpose.

Certain problems arise with armouring materials which have to be soldered instead of being welded, because the soldering material will tend to flow away from non-horizontal places. Such a solution which constitutes a second embodiment of the invention, is illustrated in FIG. 8. The armouring wires which may be circular or flat, are soldered together to constitute a row of individual joints. After jointing of the cable core (conductor(s) and insulation and possible shields) the armouring wires are brought to overlap while being maintained in correct positions as described in connection with FIGS. 1–7. There should preferably be used brackets 5 constituted by sub-brackets 6, as well as clamping devices 9 tensioned by bolts or rods 14. The length of the joint row will be one armouring wire pitch length and the cross-section of the armour joint taken at line B—B will be as illustrated in FIG. 5.

In some cases the dimensions of the cable are so large that the armouring cannot readily be wound back from the cable ends while jointing the core. In such cases the armouring is removed before jointing of the core and replaced by pretwisted armouring wire pieces afterwards. FIG. 9 illustrates two cable ends which are prepared for jointing of the core, and where the armour joint will be of the soldered type. In the case of the FIGS. 1–7 circumferential joints the two armouring joints may be arranged at any convenient place, while in the case of soldered row joints the distance between the row joints will have to correspond to an exact multiplum of pitch lengths. The complete joint is shown in FIG. 10, showing two row joints 20 and 21.

When making the joints 20 and 21, it should be noted that only one of the joints will have to be performed in accordance with FIG. 8 of the present invention. Joint 21 can be performed by jointing the pretwisted replacement wires 22 to the armouring wires 23 (FIGS. 9, 10) on the right hand cable end without tensioning. Care must, however, be taken to keep all wires in their predetermined positions. Once the right hand joint 21 has been completed, the left hand joint 20 will be completed by jointing the wires 22 to the left hand armouring wires 24 in accordance with the technique already described in connection with the first embodiment of the invention and that described in connection with FIG. 8.

The sub-brackets indicated in the drawings are made to be pressed towards each other in a direction parallel to the cable axis. Alternatively these brackets could have sides parallel to the lay angle of the armouring elements, and the clamping devices could be arranged to be tensioned towards each other in a direction parallel to the armouring element axis.

While I have described above the principles of my invention in connection with specific apparatus, it is to be clearly understood that this description is made by way of example only and not as a limitation to the scope of my invention as set forth in the accompanying claims.

We claim:

1. A method for jointing cables, each cable having a core and at least one layer of longitudinal armouring elements surrounding the core, comprising:
    cutting the armouring elements of each cable to a predetermined jointing position;
    mounting a circumferential bracket onto the elements of each of the cables to be jointed at a predetermined distance from the jointing position;
    individually securing each of the armouring elements to the circumferential bracket;
    lifting the armouring elements away from the ends of the cables;
    jointing the cable cores;
    repositing the armouring elements;
    stretching the armouring elements of each cable towards the armouring elements of the other cable so that they will overlap;
    cutting the overlapped portion of the armouring elements;
    jointing the armouring elements of the jointed cables; and
    removing the circumferential bracket thereby releasing the secured armoured elements.

2. The method according to claim 1 further comprising dividing the circumferential bracket into sub-brackets, the sub-brackets being mounted onto groups of at least two armouring elements, thereby facilitating the lifting of the armouring elements away from the ends of the cables.

3. The method according to claim 2, wherein tensioning of the armouring elements to obtain overlapping of the elements includes applying a circumferential clamping device to each bracket on each cable and pressing the clamping devices together in a direction parallel to the cable axis.

4. The method according to claim 3, wherein jointing of the armouring elements is performed in groups of at least two elements, while maintaining the pressure on the brackets until all elements have been jointed.

5. The method according to claim 1, further comprising placing a metallic shield around the cable core before jointing of the tensioning elements in order not to damage the cable core with heat caused by the jointing and to reduce corrosion of the armouring elements at the jointing position.

6. The method according to claim 1, further comprising, before mounting the brackets onto the armouring elements, cutting back the armouring elements on at least one of the cables to allow jointing of the cable core, and then mounting pretwisted replacement armouring elements to the cut armouring elements.

7. The method according to claim 1, wherein the locking of the elements occurs at a distance sufficient to allow jointing of the elements along a generatrix of the cables.

* * * * *